: 2,725,409
Patented Nov. 29, 1955

2,725,409

PREPARATION OF TRICHLOROBENZENE OF ENHANCED 1,2,4-ISOMER CONTENT

Theodore Williams Heiskell, New Martinsville, W. Va., and Edward C. Workman, Milford, Ohio, assignors to Columbia-Southern Chemical Corporation No Drawing. Application October 10, 1952,
Serial No. 314,227

3 Claims. (Cl. 260—650)

This invention pertains to a novel method of converting benzene hexachloride to trichlorobenzene whereby optimum yields of the 1,2,4-trichlorobenzene isomer are attained.

Conventional methods of preparing benzene hexachloride provide products which contain a mixture of five isomers thereof, namely the alpha, beta, gamma, delta, and epsilon isomers. Of these, only the gamma isomer exhibits insecticidal properties. As a general rule, gamma concentrations of between 12 to 16 per cent by weight of the total benzene hexachloride prepared according to the processes described in the literature are obtained. The other 84 to 88 per cent of the product is undesirable and it is common to separate at least a portion of those inactive isomers which are not effective insecticides to obtain a gamma rich product, or to prepare essentially pure gamma isomer by removal of all the "waste isomers." Utilization of these separated isomers has been a difficult problem.

It has been suggested that the undesirable isomers be converted to other products such as trichlorobenzene which are of economic value. Although it has been heretofore possible to prepare trichlorobenzene by dehydrohalogenation of any benzene hexachloride isomer or mixture thereof, certain disadvantages have been encountered. When benzene hexachloride has been converted to trichlorobenzene by the action of sodium hydroxide, an isomeric mixture of 1,2,4-trichlorobenzene, 1,2,3-trichlorobenzene and 1,3,5-trichlorobenzene is obtained, with the 1,2,4-trichlorobenzene predominating and generally comprising from 70 to 80 per cent thereof.

Of the three isomers, 1,2,4-trichlorobenzene is the most important from the economic point of view. It is employed in preparation of herbicides such as 2,4,5-trichlorophenoxy acetic acid and esters thereof. Because of the importance of 1,2,4-trichlorobenzene isomer and also since these isomers are not readily separable from each other by conventional expedients such as fractional distillation, it is advantageous to prepare a product which contains an optimum concentration of the 1,2,4-trichlorobenzene isomer.

According to this invention, it has been found that benzene hexachloride may be dehydrohalogenated with sodium hydroxide to provide 1,2,4-isomer concentrations substantially in excess of 80 per cent, and under optimum conditions as high as 92 per cent or more by weight of all trichlorobenzenes by maintaining the concentration of sodium hydroxide above about 25 per cent by weight of the aqueous phase of the reaction mixture.

This invention is performed by establishing an aqueous reaction mixture containing any isomer or mixture of isomers of benzene hexachloride and sodium hydroxide wherein the concentration of the sodium hydroxide in the reaction mixture is in excess of at least about 25 per cent by weight of the water and sodium hydroxide. Preferably, the temperature of the mixture is maintained at or above the boiling temperature of the mixture, i. e., above 100° C., although the reaction proceeds at lower temperatures. In the preferred embodiment, vapors of water and trichlorobenzene are continually removed from the reacting mass by distillation when the mass is at or above its boiling temperature. One convenient expedient for heating the reacting mass in the preferred embodiment is by the addition of steam. These vapors may be condensed and separated by a simple phase separation with the resulting organic phase being appropriately purified. The aqueous phase may be recycled to the reaction mixture.

It has been found that the concentration of the sodium hydroxide is a critical factor in obtaining high 1,2,4-trichlorobenzene concentrations. Unless the concentration of sodium hydroxide exceeds 25 per cent by weight of the water and sodium hydroxide in the reaction mass, the concentration of 1,2,4-trichlorobenzene isomer is below 80 per cent of the ultimate mixture of trichlorobenzenes. However, when sodium hydroxide is employed in concentrations at or above about 25 per cent, concentrations of the 1,2,4-trichlorobenzene isomer ranging from 80 to 93 per cent are obtained.

By concentration of sodium hydroxide in the reaction mixture, it is to be understood that for practical purposes an overall average concentration during the course of the reaction is meant. Thus, the high 1,2,4-trichlorobenzene isomer concentrations are obtained in accordance with this invention when the overall average concentration of the mixture exceeds about 25 per cent, e. g., when the concentration is initially 30 per cent and uniformally declines until it is 20 per cent at the conclusion of the reaction.

It further should be understood that the concentration of sodium hydroxide should be at least about 25 per cent throughout a major portion of the reaction period in order to obtain high 1,2,4-trichlorobenzene isomer concentrations. Therefore, the concentration of sodium hydroxide should be at least about 25 per cent during over half of the reaction period, and more normally, it is desirable to maintain this concentration for at least 75 per cent of the reaction period. Preferably, of course, the high concentration is maintained for the entire reaction period.

Concentrations as high as 70 to 75 per cent (based on NaOH and water in the mixture), or even higher, of sodium hydroxide may be employed. At these higher sodium hydroxide concentrations, the concentration of the 1,2,4-trichlorobenzene isomer often exceeds 92 per cent by weight of the isomers, with concentrations of 95 having been obtained.

Appropriate concentrations of sodium hydroxide throughout the course of the entire reaction may be achieved by initially charging aqueous sodium hydroxide of the desired concentration and continually or periodically adding sodium hydroxide as the concentration tends to decrease because of the reaction. This provides a technique for maintaining an essentially constant concentration of sodium hydroxide. It is also possible to initially utilize a more highly concentrated solution of sodium hydroxide without adding sodium hydroxide during the reaction period, if precautions are taken to select a sufficiently concentrated solution such that the average concentration remains above 25 per cent during at least a major portion, and preferably all, of the reaction period.

In reactions where water and trichlorobenzene are continually removed from the reacting mass, proper adjustment of the amount of water recycled may be employed to aid in control of the sodium hydroxide concentration. Thus, if recycle of this water is minimized, higher sodium hydroxide concentrations will be maintained than if recycling is practiced. It is often possible to obtain the respective advantages of recycling water and of employing a minimum quantity of sodium hydroxide by balancing the two variables.

Three moles of sodium hydroxide react with a single mole of benzene hexachloride to form one mole of trichlorobenzene and the reactants are used in such ratio. It sometimes is beneficial to employ a slight excess of sodium hydroxide, e. g., 5 to 10 mole per cent above that theoretically required.

The reaction is performed while maintaining the temperature at or above the boiling temperature of the mixture. At elevated temperatures, above 100° C., the rate of reaction is increased. Under atmospheric pressure, reaction temperatures of from 105° C. to about 135° C. are employed, depending on the concentration of the sodium hydroxide. Somewhat lower temperatures, such as 90° C., are also operable. Higher concentrations raise the boiling temperature of the mixture. When the reaction is performed at superatmospheric pressures, even higher temperatures are useful.

Although the invention is preferably practiced with the waste isomers of benzene hexachloride, i. e., the alpha, beta, delta, or epsilon isomers, the reaction is effective with any isomer or mixture of isomers. A mixture of isomers which contains a predominant portion of alpha isomer, e. g., 80–88 per cent alpha isomer, is normally employed because of economic considerations. Such mixture corresponds to the filter cake which is obtained when benzene addition chlorination slurry containing a solid phase is filtered. This filtration of the slurry is frequently employed to effect an initial separation of isomers in providing a gamma enriched product.

The following examples are illustrative of the practice of this invention:

EXAMPLE I

A one-liter, three-necked flask equipped with an air-driven, half-moon stirrer, and a reflux condenser connected to the flask by a modified Dean Stark water trap was employed for atmospheric dehydrochlorination. Heating of the flask was accomplished by a Glas-Col heating mantle controlled by a variable transformer. The water trap permitted the trichlorobenzenes to settle in the bottom while the water was reurned to the reaction flask.

One hundred grams of benzene hexachloride (alpha and beta isomers) and 10 mole per cent excess of sodium hydroxide, with sufficient water to provide the specified concentration of sodium hydroxide was placed in the flask and heat was supplied to maintain the mixture at its boiling temperature while the mixture was agitated. During the course of the reaction, water vapor and trichlorobenzene distilled were condensed in the condenser and the water was recycled after being separated from the trichlorobenzene in the water trap. The reaction was continued until trichlorobenzene ceased appearing in the overhead product, approximately 3 hours. Sodium hydroxide was added periodically to maintain a constant concentration thereof in the reaction mixture.

At the end of the reaction, the trichlorobenzene was dried, weighed, and analyzed by the infra-red techniques to ascertain the isomer distribution.

The following table summarizes the runs made employing this procedure:

*Table I*
ATMOSPHERIC PRESSURE

| NaOH Concentration, Percent | Reaction Temp., °C. | Trichlorobenzene Isomer Distribution, Percent | | |
|---|---|---|---|---|
| | | 1,2,4 | 1,2,3 | 1,3,5 |
| 10 | 107 | 73.0 | 26.2 | 0.8 |
| 20 | 111 | 76.7 | 29.9 | 1.4 |
| 25 | 114 | 80.8 | 17.9 | 1.3 |
| 30 | 117 | 82.4 | 16.3 | 1.3 |
| 35 | 119 | 85.5 | 13.2 | 1.2 |
| 50 | 127 | 86.5 | 11.2 | 2.5 |

EXAMPLE II

In employing superatmospheric pressures, a stainless steel, one-liter Magna-Dash autoclave fitted with a pressure gauge and externally heated by a Glas-Col electric heater was employed. An iron-constantan thermocouple was inserted ina Thermowell in the autoclave to record the temperature. Agitation during the reaction was supplied by a magnetic dasher operating at its optimum in rapidity of stroke as well as length of stroke.

A mixture consisting of 100 grams of alpha and beta isomers of benzene hexachloride, sodium hydroxide in a quantity equal to 10 mole per cent excess of theoretical, and sufficient water to provide the desired sodium hydroxide concentration was charged to the autoclave, the dasher started, and heat was applied to the autoclave body until the desired pressure was recorded on the pressure gauge. Thereafter, the heat source was turned off and agitation was continued until the pressure in the autoclave was atmospheric. This required about 10 hours.

The reaction mixture was removed from the autoclave by aspiration into a suction flask. Any material which might have remained was removed by washing the autoclave and aspirating into the suction flask. The organic phase was separated in a separatory funnel and then steam distilled, the product being analyzed by infrared technique to determine its isomer distribution.

Table II lists the conditions and results of a series of experiments performed in this manner.

*Table II*

| NaOH Concentration, Percent | Pressure, p. s. i. g. | Reaction Temp., °C. | Trichlorobenzene Isomer Distribution, Percent | | |
|---|---|---|---|---|---|
| | | | 1,2,4 | 1,2,3 | 1,3,5 |
| 10 | 50 | 185 | 75.2 | 23.8 | 1.0 |
| 10 | 100 | 215 | 77.3 | 21.9 | 0.9 |
| 10 | 150 | 235 | 77.3 | 21.8 | 1.0 |
| 25 | 50 | 188 | 81.2 | 17.6 | 1.1 |
| 25 | 100 | 215 | 83.1 | 15.9 | 1.0 |
| 25 | 150 | 232 | 83.5 | 15.6 | 1.0 |
| 50 | 50 | 198 | 89.1 | 9.8 | 1.1 |
| 50 | 100 | 221 | 90.9 | 8.5 | 0.6 |
| 50 | 150 | 240 | 90.7 | 8.4 | 0.8 |
| 72 | 50 | 200 | 92.7 | 6.6 | 0.7 |
| 73 | 150 | 232 | 91.3 | 7.3 | 1.3 |

It should be noted that some increase in concentration of the desired 1,2,4-trichlorobenzene isomer resulted from increasing the pressure and temperature.

EXAMPLE III

The process of this invention was performed on a larger scale at atmospheric pressures employing a 1,000-gallon steam-jacketed steel reactor with an overhead take-off leading to a condenser. Benzene hexachloride, sodium hydroxide, and sufficient water to provide the initial desired concentration of sodium hydroxide was placed in the reactor and heated to its boiling temperature. Vapors of water and trichlorobenzene were continuously distilled off via the overhead take-off and condensed in the condenser. The organic phase was separated in a settling tank and the remaining aqueous phase was recycled to the reactor.

The average isomer analysis of the benzene hexachloride employed in these runs was:

Alpha _____ 86.2
Beta _____ 10.2
Gamma _____ 3.4
Delta _____ 1.5
Epsilon _____ 0.5

The following table lists the amounts of reactants, reaction conditions and results of various runs that were made in accordance with this procedure:

Table III

| Benzene Hexachloride Charged, Pounds | NaOH Conc. Range, Percent | Average Reaction Temp., °C. | Reaction Time, Hours | Trichlorobenzene Isomer Distribution, Percent | | |
|---|---|---|---|---|---|---|
| | | | | 1,2,4 | 1,2,3 | 1,3,5 |
| 1,265 | 18-12 | 104 | 10 | 73.1 | 26.0 | 0.9 |
| 3,200 | 24-15 | 111 | 12-16 | 78.8 | 20.2 | 1.0 |
| 3,000 | 23-13 | 112 | 12-16 | 79.9 | 19.0 | 1.1 |
| 2,952 | 24-15 | 107 | 12-16 | 78.0 | 20.6 | 1.4 |
| 2,160 | 25-15 | | 12-16 | 78.2 | 20.6 | 1.2 |
| 3,000 | 17-8 | | 12-16 | 76.7 | 22.0 | 1.3 |
| 1,500 | 21-17 | 115 | 14 | 76.8 | 21.8 | 1.4 |
| 1,500 | 17-11 | 110 | 12-16 | 73.3 | 25.4 | 1.3 |
| 1,125 | 13-11 | 114 | 12-16 | 74.8 | 23.6 | 1.4 |
| 1,125 | 13-11 | 115 | 10 | 75.2 | 23.6 | 1.4 |
| 1,125 | 13-12 | 107 | 10 | 74.8 | 24.4 | 0.8 |
| 1,500 | 18-4 | 107 | 12 | 75.5 | 23.0 | 1.5 |
| 1,500 | 17-9 | 110 | 12-16 | 73.5 | 24.8 | 1.7 |
| 1,500 | 18-10 | 107 | 12-16 | 75.5 | 23.3 | 1.2 |
| 1,500 | 19-11 | 107 | 12-16 | 75.7 | 23.1 | 1.2 |
| 1,500 | 17-8 | 93 | 16 | 72.5 | 26.2 | 1.3 |
| 1,125 | 15-5 | 104 | 12-16 | 73.1 | 26.0 | 0.9 |
| 2,880 | 22-12 | 110 | 12-16 | 77.2 | 21.5 | 1.3 |
| 1,500 | 33-30 | 127 | 12-16 | 85.3 | 13.4 | 1.3 |
| 1,500 | 35-27 | 129 | 10 | 85.8 | 12.7 | 1.5 |
| 1,000 | 46-44 | 140 | | 86.5 | 11.9 | 1.7 |

Thus, it is clear from the results of these experiments that high sodium hydroxide concentrations, that is, those above 25 per cent, favor the formation of the 1,2,4-trichlorobenzene isomer at the expense of the 1,2,3-trichlorobenzene isomer. The concentration of 1,3,5-trichlorobenzene apparently remains essentially constant. This invention, therefore, provides a means for minimizing the formation of the 1,2,3-trichlorobenzene isomer in dehydrohalogenating benzene hexachloride with sodium hydroxide.

Although the present invention has been described with reference to the specific details of certain embodiments thereof, it is not intended that such details shall be regarded as limitations upon the scope of the invention, except insofar as included in the appended claims.

We claim:

1. In the dehydrochlorination of benzene hexachloride to produce trichlorobenzene containing an enhanced 1,2,4-trichlorobenzene concentration, the step of reacting benzene hexachloride with an aqueous sodium hydroxide solution, said solution having a sodium hydroxide concentration of at least 25 per cent by weight of the sodium hydroxide and water during a major portion of the reaction period.

2. A method of preparing trichlorobenzene containing an enhanced 1,2,4-trichlorobenzene concentration by dehydrochlorination reaction of benzene hexachloride with sodium hydroxide which comprises establishing a reaction mixture of benzene hexachloride, sodium hydroxide and water, maintaining the concentration of the sodium hydroxide in the reaction mixture at least 25 per cent by weight of the sodium hydroxide and water, and heating the reaction mixture.

3. The method of claim 2 wherein the reaction mixture is heated to at least its boiling temperature.

References Cited in the file of this patent

FOREIGN PATENTS 993,097    France _____ July 18, 1951

OTHER REFERENCES

"Chemical Abstracts," vol. 44, col. 10245 (1950). Abstract of article by Nakijima et al.